United States Patent Office 3,082,177
Patented Mar. 19, 1963

3,082,177
PROCESS FOR PREPARING THERMOSTABLE THERMOPLASTIC COMPOSITIONS COMPRISING POLYPHENYLENES
Martin Anderson, 1-H Gardenway, Greenbelt, Md.
No Drawing. Filed Dec. 13, 1960, Ser. No. 75,469
4 Claims. (Cl. 260—2)

This invention relates to a process for preparing thermostable thermoplastic compositions comprising polyphenylenes of high molecular weight.

Polyphenylenes have for years been known as laboratory curiosities, and a scant but continuing and descriptive body of literature has been devoted to their properties and preparation. Since all reported reactions involve sensitive free-radical mechanisms, there have been many difficulties attendant upon the synthesis of polyphenylenes. However, the principal difficulty has arisen from the nature of the products which are extraordinarily high melting and virtually insoluble in most solvents. In solution polymerizations the reaction is simply terminated by precipitation of lower molecular weight polymers which are then effectively excluded from further reaction and almost impossible to separate from catalysts and other solid impurities. Alkali metal condensations of halobenzenes have been the most frequently attempted routes to polyphenylenes. However, the products which separate from solution at an early stage are of low molecular weight, are often contaminated with molecularly bound chlorine, and are often amorphous rather than crystalline. It does not now appear possible to prepare the higher polymers of this series successfully through such Wurtz-Fittig type reactions.

I have discovered that polyphenylenes may be prepared by the reaction of nitrous acid gases with molten N-acylaminobenzenes, the reaction mass being always maintained above its fusion point, whereby homogeneity is constantly maintained and lower molecular weight and monomeric products are continually distilled from the reaction. The system is solvent-free and represents a true homogeneous or mass homopolymerization in which reactants, intermediates, and product polymers coexist in the same physical state and identically distributed. While not wishing to be bound by any theory since the reaction mechanism is not completely understood, it is believed that the reaction proceeds through decomposition of N-nitroso intermediates with polymerization of the phenyl free-radicals thereby formed.

Recent engineering developments have required the preparation of thermoplastics which are workable and stable at high temperatures. The known polyphenylenes have melting points which are higher than those of many metals, including tin, bismuth, lead, and zinc; and it has long been theoretically predictable that macromolecular polyphenylenes could have melting points in excess of 1000° C. The unusual molecular nature of these substances also confers upon them the properties of thermostable semi-conductors. While many scientists have been familiar with these facts, the efficient preparation of polyphenylenes has been limited by the inadequacies inherent in existing techniques. It is thus the purpose of this invention to provide a process for preparing polyphenylenes utilizing a homogeneous, solvent-free, liquid system of mass homopolymerization of an N-acylaminobenzene in the presence of a nitrosating agent.

The ensuing discussion is illustrative of the best operational practice as taught by this invention. In the preferred embodiment, a vessel containing N-acetylaminobenzene is heated to a temperature above the fusion point of the compound which is 114° C. An initial temperature of 120–130° C. is satisfactory. Pass into this melt nitrous acid gases derived from the acidic decomposition of nitrite salts. As the reaction proceeds, the reaction mass will tend continually towards solidification. Therefore, the heat input must always be sufficient to maintain the fluidity of the system through or until the termination of the reaction. This is achieved by continually carrying out the reaction at increasingly higher temperatures always sufficient to correct for the constant increase in the solidification point. The operating temperature should not be permitted to exceed the boiling temperature, at the operating pressure, of N-acetylaminobenzene until the solidification temperature of the reaction mass itself approaches that value. Conclusion of the reaction in each particular run is evidenced by the attainment of a maximum and constant solidification temperature. The reaction may be terminated at any desired lower temperature. The raw products are crystalline and yellowish to dark brown in color.

It is advisable to exclude air, oxygen, water vapor, and atmospheric contaminants from the system and the polymerization is best performed under vacuum with or without a constant throughput of inert gas. However, even with the reaction exposed to the atmosphere, solidification temperatures of the order of 300° C. are attainable without significant deterioration of reaction contents. The reaction mass should be constantly agitated or stirred. Anhydrous materials of the highest available purity should be used. The nitrous acid gases should be dried prior to admission into the reaction. These gases have the empirical formula $N_2O_3$ and probably comprise a mixture of NO and $NO_2$. They are most conveniently generated by hydrolyzing C.P. grade sodium nitrite with C.P. grade concentrated phosphoric acid and passing the effluent gases through a drying train. An inert carrier gas may desirably be utilized. Other nitrosating agents may alternatively be used, provided they leave no active residuum in the reaction system. Nitrosyl chloride is of particular value and eliminates generation of water as a reaction product. The operative nitrosating agents are thus obviously all trivalent compounds of nitrogen.

While the raw products are of considerable value, some upgrading may be achieved through conventional purification techniques to remove materials of lower melting point. Among useful techniques are solvent extraction and molecular distillation. Washing with aqueous acids and bases is also of value in removing impurities and destroying reactive surviving intermediates as may remain. It is most advantageous to allow molecular distillation in situ during polymerization, thus permitting separation as a direct continuing function of molecular weight. The system is then self-purifying. This effect, also evident through conventional distillation as a function of vapor pressure rather than molecular weight, is an inherent property of the process of this invention. As a consequence of this self-purification, the system exhibits a thermal feedback independent of the reaction proper, whereby with increased purity the solidification point will tend towards a higher value concurrently with the polymerization.

The acyl substituent of the N-acylaminobenzene may broadly be selected from any aliphatic carbonylic radical of relative homolytic inertness under the reaction conditions. The preferred acyl substituents will be fatty acyls and in general they should be selected from the group consisting of formyl, acetyl, and propionyl. The aromatic ring may have inert substituents in the ortho and para positions. These ring substituents may particularly be halogen and alkyl.

The products of this invention may be compounded with fillers, dyes, pigments, plasticizers, and other additives. They may be formulated with thermoplastic and thermosetting polymers. Compositions may be prepared comprising various mixtures of the thermostable products of this invention with metals and ceramics leading to valuable new substances including metallo-plastic alloys.

I claim:
1. A process for preparing a thermostable thermoplastic composition, said process comprising the reaction of a nitrosating agent selected from the class of trivalent nitrogen compounds consisting of $N_2O_3$ and nitrosyl chloride with a fused N-acylaminobenzene, wherein the acyl substituent is selected from the class consisting of formyl, acetyl, and propionyl, the reaction mass being maintained in the liquid state throughout the reaction.
2. The process of claim 1 wherein the nitrosating agent is $N_2O_3$.
3. The process of claim 1 wherein the N-acylaminobenzene is N-acetylaminobenzene.
4. The process of claim 3 wherein the nitrosating agent is $N_2O_3$.

References Cited in the file of this patent

Wieland: Berichte 54B, 1776–84 (1921).
Terenter et al.: Chemical Abstracts, vol. 32, page 2519 (1938).
Ohashi et al.: Chemical Abstracts, vol. 52, page 6057 (1958).
Parini et al.: Chemical Abstracts, vol. 53, pages 8057–8 (1959).
Shorygin et al.: Chemical Abstracts, vol. 33, page 3781 (1939).